United States Patent
Yeckley

(12) United States Patent (10) Patent No.: US 7,392,691 B1
(45) Date of Patent: Jul. 1, 2008

(54) METHOD AND APPARATUS FOR DETECTING THE LEVEL OF A LIQUID

(75) Inventor: Alexander J. Yeckley, Castalia, OH (US)

(73) Assignee: Sierra Lobo, Inc., Fremont, OH (US)

( * ) Notice: Subject to any disclaimer, the term of this patent is extended or adjusted under 35 U.S.C. 154(b) by 130 days.

(21) Appl. No.: 11/255,416

(22) Filed: Oct. 20, 2005

(51) Int. Cl.
*G01F 23/22* (2006.01)

(52) U.S. Cl. ........................ 73/64.55; 73/295

(58) Field of Classification Search ............... 73/64.55, 73/295
See application file for complete search history.

(56) References Cited

U.S. PATENT DOCUMENTS

| | | | |
|---|---|---|---|
| 3,465,587 A * | 9/1969 | Pierce | 73/295 |
| 3,734,123 A * | 5/1973 | Pomerantz | 137/392 |
| 3,755,801 A * | 8/1973 | Milo | 340/622 |
| 4,949,069 A * | 8/1990 | Wilson | 340/450.1 |
| 6,431,750 B1 | 8/2002 | Haberbusch et al. | |

OTHER PUBLICATIONS

"Cryo-Tracker ™ Level, Temperature, and Mass Gauging Fluid Sensors", Sierra Lobo, Inc., Aug. 21, 2003, pp. 1-9.*

* cited by examiner

*Primary Examiner*—Daniel S. Larkin
(74) *Attorney, Agent, or Firm*—Pearne & Gordon LLP

(57) ABSTRACT

A system for determining the position of a gas/liquid interface of a fluid in a tank having a probe and a controller. The probe has silicon diodes arranged linearly on a substrate. The controller applies power to each of the silicon diodes to make a determination of whether a fluid in which the silicon diode is immersed is a liquid or a gas based on a rate of transfer of heat from the silicon diode to the fluid. A method for determining the phase of a fluid in which a sensor is immersed includes the steps of immersing the sensor in a fluid and increasing power applied to the sensor. The value of a thermal transient of the sensor is then measured and the phase of the fluid is determined based on the measured value of the thermal transient.

24 Claims, 4 Drawing Sheets

METHOD AND APPARATUS FOR DETECTING THE LEVEL OF A LIQUID

This invention was made with Government support under contract F296-1-02-C-0210 with the U.S. Air Force and funding provided by the Missile Defense Agency. The Government has certain rights in the invention.

BACKGROUND OF THE INVENTION

The present invention relates to measuring the liquid level or position of a gas/liquid interface along the length of a probe and, in particular, to a probe for measuring the temperature and gas/liquid interface position in a tank of cryogenic liquid.

In cryogenic liquid tanks (for example, propellant tanks for aerospace vehicles), it is important to know the temperature in various levels of the liquid and to know the level of the liquid within the tank. As the density of the liquid varies with temperature, this information is important to determine such values as the mass of the liquid in the tank.

Propellant tanks are usually more than 5 feet tall and typically in the range of 8 to 100 feet tall. One known device for the measurement of the temperatures in these tanks includes temperature sensors mounted on a metallic rake-like structure consisting of vertical and horizontal beams with temperature sensors mounted at various locations on the rake. Typical temperature sensors include silicon diodes, thermocouples, thermopiles, thermistors, and RTDs.

Another type of probe used for taking measurements of cryogenic liquid in a tank is disclosed in U.S. Pat. No. 6,431,750 to Haberbusch et al, which is incorporated by reference herein. The probe disclosed therein is a lightweight elongate flexible temperature probe including several temperature sensors embedded inside multiple layers of a thin film polyimide or polyester. In two of the layers, thin film copper is etched to form conductors to the sensors. The conductors are in abutting electrical contact with the sensors.

Known temperature probes, such as those described above, can be used to estimate the level of liquid the tank based on the temperatures sensed at various levels. However, in a partially empty tank, the cryogenic liquid may evaporate to form a layer of cryogenic gas above the liquid. Therefore, it can be difficult to ascertain the precise level of the liquid, since the cryogenic gas may have a temperature very close to that of the liquid.

BRIEF SUMMARY OF THE INVENTION

According to one aspect, the present invention provides a system for determining the level of a liquid in a tank. The system comprises a probe comprising a plurality of silicon diodes arranged linearly on a substrate; and a controller for controlling power applied to each of the plurality of silicon diodes to make a determination of whether a fluid in which the silicon diode is immersed is a liquid or a gas based on a rate of transfer of heat from the silicon diode to the fluid.

According to a further aspect, the present invention provides a method for determining the phase of a fluid in which a sensor is immersed. The method comprises the steps of: immersing a sensor in a fluid; increasing power applied to the sensor; measuring a value of a thermal transient of the sensor; and determining a phase of the fluid based on the measured value of the thermal transient.

According to a further aspect, the present invention provides a method of determining a level of a liquid in a tank, the method comprises the steps of: installing a probe in the tank, the probe comprising a plurality of silicon diodes arranged linearly on a substrate; immersing the probe in fluid; increasing power to at least two of the plurality of silicon diodes; measuring a value of a thermal transient of each of the silicon diodes; determining a phase of the fluid at each of the at least two silicon diodes based on the measured value of the thermal transient; and determining a location of a gas/liquid interface based on the phase determined for each of the at least two diodes.

DETAILED DESCRIPTION OF THE INVENTION

Figure 1:
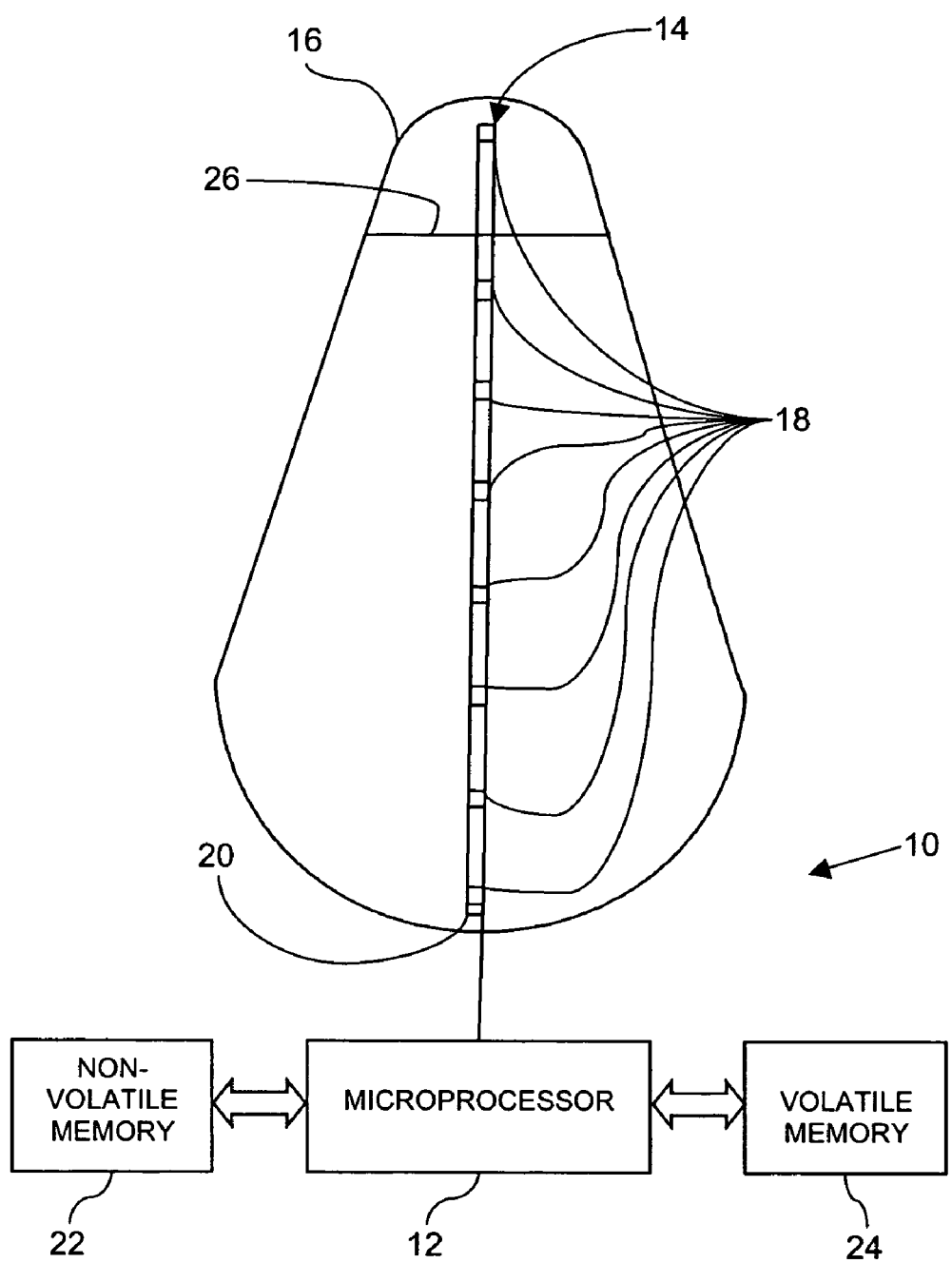
FIG. 1 is a schematic illustration of a liquid level and temperature sensing system installed on a cryogenic tank according to an example embodiment of the present invention.

According to the present invention, a liquid level detecting and temperature measuring system is provided in which silicon diodes in a temperature sensing probe are used to determine a liquid level in a cryogenic tank. As used herein, the term "liquid level" refers to an interface between a gas and a liquid ("gas/liquid interface"). In some environments, the typical planar liquid level surface may not be present, such as when a gravity vector is less than 1 g, for example, in the near weightless environment of space or earth orbit.

The present invention operates on the principle that the effective heat transfer rate (h) between a silicon diode (including surrounding probe material) and a surrounding liquid differs from the effective heat transfer rate between the same diode and a surrounding gas. This principle holds true even when the temperature of the gas is identical to the temperature of the liquid.

According to the present inventions two different thermal transient processes are introduced for determining whether surrounding fluid is in a liquid or a gas phase. These transients result from the self-heating characteristics of a silicon diode. The initiation of these transients is controlled using a microcontroller. After initiation, the controller observes the system response to the transients in order to make the phase determination.

The first thermal transient is created by the temperature rise of the silicon diode and surrounding probe material due to the addition of electrical energy. During the initial heating of the silicon diode, energy is being removed by the cryogenic fluid (liquid or gas). As a result, the temperature of the silicon diode increases measurably during this initial heating. In order for the silicon diode to generate a thermal transient, which eventually reaches a thermal steady state, the heat transfer rate into the diode and surrounding probe material must be greater than the initial heat transfer rate from the probe material into the cryogenic fluid. This can be accomplished by providing sufficient power to the silicon diode. Experimental results have shown that an electrical current of approximately 30 mA or greater applied to the silicon diode results in sufficient self heating of the silicon diode.

The second thermal transient results from the discontinuation of the self-heating current described above. The latent energy remaining in the probe material is transferred to the cryogenic fluid over a short period of time. Eventually (a matter of seconds) the temperature of the silicon diode and surrounding probe material reaches a steady-state temperature identical to the adjacent fluid.

Both the first and second thermal transient processes, as described above, can be modeled using relatively simple equations. The theory governing these processes will described in detail below.

First, the heating thermal transient will be described. For simplification, a theoretical, isothermal "local lump" of material of an indeterminate size and heat capacity will be used to represent a silicon diode and the adjacent probe material according an example embodiment of the present invention. During self-heating, energy accumulates in the silicon diode and the probe material immediately adjacent to it according to the following mathematical relationship.

$$\frac{dE}{dt} = W_{electrical} - q_{fluid} \quad (1)$$

The first term, $W_{electrical}$, on the right side of equation 1 represents the electrical power input to the silicon diode. The second term, $q_{fluid}$, represents the heat that is dissipated directly to the fluid in the immediate area of the probe. Since, according to the present invention the first term, $W_{electrical}$ is greater in magnitude than the second term, $q_{fluid}$, there is a net accumulation of energy in the probe during the heating thermal transient. This net accumulation of energy is manifested by a rise in temperature of the local lump.

Given an arbitrary silicon diode subjected to a constant current flow through it:

$$V = f(T), \quad (2)$$

where

V=voltage dropped across the diode junction, and
T=temperature of the diode junction.

In equation 2, V and T are inversely proportional, such that the voltage, V, decreases as the temperature, T, of the diode junction increases.

The electrical power input, $W_{electrical}$, is fixed since a constant current, I, is applied to the silicon diode, and the effective resistance of the silicon diode will change a negligible amount. Thus, according to equation 3, below, the power input, $W_{electrical}$, is thus essentially independent of the fluid state surrounding the probe, which is a requirement of the present invention.

$$W_{electrical} = I^2 R_{diode} \quad (3)$$

The fluid heat transfer term, $q_{fluid}$, will vary depending on the fluid phase: liquid or gas. Assume that the heat transfer rate of a body at temperature T submerged into an isothermal bath at $T_\infty$ is determined by:

$$q_{fluid} = h_{fluid} A (T_\infty - T), \quad (4)$$

where q=heat transfer rate,
h=heat transfer coefficient,
A=area across which heat flows, and
T=temperature.

In the present example, the local lump is considered to be the subject body. The heat transfer, $q_{fluid}$, only begins to take place when sufficient electrical power, $W_{electrical}$, is applied to the silicon diode or lump. Here, A represents the effective area of surface contact between the lump and the fluid, or "wetted area," of the lump, and T represents the instantaneous temperature of the lump. It is not necessary to know the exact area A for reasons which will be apparent from the description below.

Eventually, a state of thermal equilibrium is reached when the power input to the diode matches the heat transfer rate away from the diode and the temperature of the diode ceases to rise. It should be appreciated that the present invention does not require the system to actually reach this equilibrium state.

Second, the cooling thermal transient will be described. During cooling, after power has been removed from the silicon diode, the accumulated energy in the local lump is dissipated into the surrounding fluid due to the difference in temperature according to the following mathematical relationship:

$$\frac{dE}{dt} = -q_{fluid}. \quad (5)$$

Using the so-called incompressible substance model and the first law of thermodynamics, the temperature relationship between the local lump and time can be represented by the following equation:

$$-\frac{h_{fluid} A}{\rho c V}(T - T_\infty) = \frac{dT}{dt}. \quad (6)$$

Integrating the local lump temperature (T) and time (t) produces:

$$\frac{T_f - T_\infty}{T_i - T_\infty} = e^{-\frac{h_{fluid} A}{\rho c V}(t_f - t_i)}, \quad (7)$$

which is a simple exponential decay relationship. The terms A, $\rho$, c and V are constants unique to the construction of a particular probe. These terms are independent of the fluid in which the probe is immersed. Accordingly, a "probe constant" can be determined as follows:

$$k_p = \frac{A}{\rho c V}. \quad (8)$$

Note that the probe constant, $k_p$, is essentially the inverse of a time constant, $\tau$, as used in an electrical analogy:

$$k_p = \frac{1}{\tau}. \quad (9)$$

Treating the parameters according to equations 8 and 9, and rearranging equation 7, a more intuitive form is produced:

$$T_f = (T_i - T_\infty) e^{-hk_p(\Delta t)} + T_\infty, \quad (10)$$

where $\Delta t = t_f - t_i$.

Treating the thermal behavior of the probe in terms of a time constant, $\tau$, allows the behavior of the temperature of the probe to be analogized to an electrical charge in a capacitor undergoing discharge, or the corresponding voltage across the capacitor, resulting in the following equation:

$$T_f = (T_i - T_\infty)e^{-\frac{\Delta t}{\tau}} + T_\infty. \quad (11)$$

Thus, the analogy of a charging capacitor is applicable during the heating thermal transient.

According to the present invention, since the probe geometry will not change over the life of the system, it is only necessary to consider relative heat transfer rates, whether during heating or cooling, in order to determine the presence of liquid or gas. As shown above, the determination of a probe constant simplifies the determination of fluid phase according to the present invention. Based on observation of the above equations, the following further simplification is possible: the heat transfer coefficient, h, is inversely proportional to the time constant, τ, of an exponential decay process. It is therefore possible to create a table, using empirical methods, containing time constants for both liquid and gas probe immersion. According to the present invention, such a table is used by a microcontroller to determine the immersion state of each silicon diode in the probe. In practice, although it is not immediately apparent from the simplified mathematical behavior models presented above, the time constant for heating may be different than the corresponding time constant for cooling. Taking advantage of this asymmetry, a system of "checks and balances" can be implemented, wherein the determination is made using both the heating thermal transient and the cooling thermal transient. If the same conclusion (i.e. liquid or gas) is not reached for a particular silicon diode during each thermal transient, a system malfunction may be indicated. Alternately, the system can use only the heating transient or the cooling transient to determine the fluid phase, which would effectively doubles the frequency of liquid level determinations.

According to the present invention, there are two modes of operation for the silicon diodes: 1) a "liquid level" mode in which the fluid phase at each silicon diode is determined according to the above principles, and 2) a "temperature" mode according to the prior art, as described for example in U.S. Pat. No. 6,431,750. In the liquid level mode, a relatively large amount (e.g. 30 mA) of current is passed through a forward-biased silicon diode. The temperature of the silicon diode cannot be accurately measured in this mode. The diode responds nearly instantaneously, from an electrical perspective, to the switching of the mode. From a thermal perspective, the silicon diode does not respond instantaneously. As a result, each silicon diode can be switched from liquid level mode to temperature mode in a matter of microseconds, and then an accurate temperature measurement can be taken in a few microseconds. The diode can then be switched back into liquid level mode only a few more microseconds later. Although the diode junction cools slightly when switched from liquid level to temperature mode, the short period of time involved (i.e. several microseconds) causes only a small latency error to be introduced into the liquid level determination process, since only a small amount of heat will have been lost to the fluid.

As explained above, the relative rates of heat transfer during both the heating and cooling thermal transients can be determined by observation of finite temperature changes over finite periods of time. The smallest acceptable temperature change, ΔT, or time increment, Δt, necessary to meet the particular accuracy requirements for a system would result in the fastest overall system response to changes in the liquid level in a tank. Either of the following two approaches can be used, as appropriate, to determine the time constant for a chosen Δt. These approaches can be performed manually or, alternatively, can be performed automatically by a microprocessor controlling the system. Each approach has relative advantages and disadvantages that should be considered relative to the particular application.

The first approach is to identify a target temperature change, ΔT (one for heating and another for cooling), and then to measure the amount of time, Δt, required for each of these changes to occur. An ideal or optimum temperature change, ΔT, is determined by balancing the desired level of accuracy required with the need to minimize cycle duration. It has been determined through experimentation that a ΔT of 5 K is satisfactory. This approach requires repeatedly sampling the diode temperature during the transients.

The second approach is to identify a likely period of time that a suitable rate of temperature change would occur, and to sample the diode temperature at only the beginning and end of this time period. With this method, there is potentially less switching between the liquid level mode to the temperature mode required, and therefore less latency error is introduced. It does however require an educated guess at the appropriate length of time for the desired amount of heating and cooling.

Using the second approach described above, the system according to the present invention performs a "learning" operation to determine the appropriate length of time for both heating and cooling. This learning operation can be performed at whatever interval is appropriate to the application. The learning may take place in a laboratory setting and be set to a fixed value. Alternatively, the learning process can take place in situ, i.e. be performed with the temperature probe installed in a tank as an initial setup operation.

One learned parameter is the period of time, ΔT, over which to consider the time constant, τ. When the time constant learning process is performed in situ, at least one diode in the system must be exposed to a gas/liquid interface. That is, a single silicon diode must be immersed in liquid for a period of time and in gas for another period of time. The time constants which are learned from that silicon diode can then be used for all the silicon diodes in the probe.

Further, the use of "interface diode adjacency" can be implemented in a method according to the present invention. For example, it will be assumed that there a plurality of silicon diodes, each positioned at a different vertical position in a tank. The system of the present invention can identify which silicon diode(s) are immersed in liquid and which silicon diode(s) are immersed in gas. Based on these determinations, the position of the gas/liquid interface can be determined. Normally, the position of the gas/liquid interface or liquid level will increase or decrease at a relatively slow rate as fluid is added or removed from the tank, and thus, will not tend to skip over one or more of the silicon diodes. In such cases, only silicon diodes immediately adjacent to the gas/liquid interface will detect a change in fluid phase at any given time. It is therefore only necessary to observe these adjacent diodes to determine changes in the level of the gas/liquid interface in the tank. As the gas/liquid interface moves out of range of an active silicon diode, the next logical one can be made active and the original can be inactivated so that the gas/liquid interface is always surrounded by two active silicon diodes. Since the majority of the diodes may be kept turned off at any given time, the required power input to the tank is reduced and the overall system response is improved by reducing the computational workload. Further, the rate of change of the position of the gas/liquid interface can be estimated during the learning process, so that as the gas/liquid interface approaches a nonadjacent silicon diode, the diode can be thermally preconditioned, if needed depending upon the specific application, by applying a reduced amount of current in advance of applying the full current (e.g. 30 mA). Further, the operation of the system according to the present invention can be modified to predict and compensate for interface oscillations or "sloshing", as well as for other conditions as appropriate.

According to an example embodiment, a liquid level detecting system according to the present invention may perform the learning operation as follows. In the example embodiment, the probe system will be used in conjunction with a software-based Mass Gauging System (MGS).

According to the example embodiment, as illustrated schematically in FIG. 1, the liquid level detecting system 10 includes a microprocessor or controller 12 connected to a diode probe 14, which is attached to a cylindrical tank 16 designed for use with normal boiling point liquid nitrogen ("LN2"). It should be appreciated that tanks having other shapes, such as spherical, prismatic, etc., and containing other fluids can be used with the present invention.

The diode probe 14 includes a plurality of vertically spaced silicon diodes 18 attached to a flexible dielectric strip 20, such as is described in detail in U.S. Pat. No. 6,431,750. The temperature offset or error for each silicon diode 18 on the probe 14 is determined experimentally in a lab and corresponding values are stored in non-volatile memory 22 provided to the microprocessor 12. The temperature offsets are used as a correction factor during the temperature determination process. The microprocessor 12 is also provided with volatile memory 24 for use during normal operation of the system 10. Prior to starting the learning process, the tank 16 is initially empty, and is prepared to be filled for the first time. The tank 16 has been purged with warm gaseous nitrogen ("GN2"), and the silicon diodes 16 are all at ambient temperature.

Figure 2:
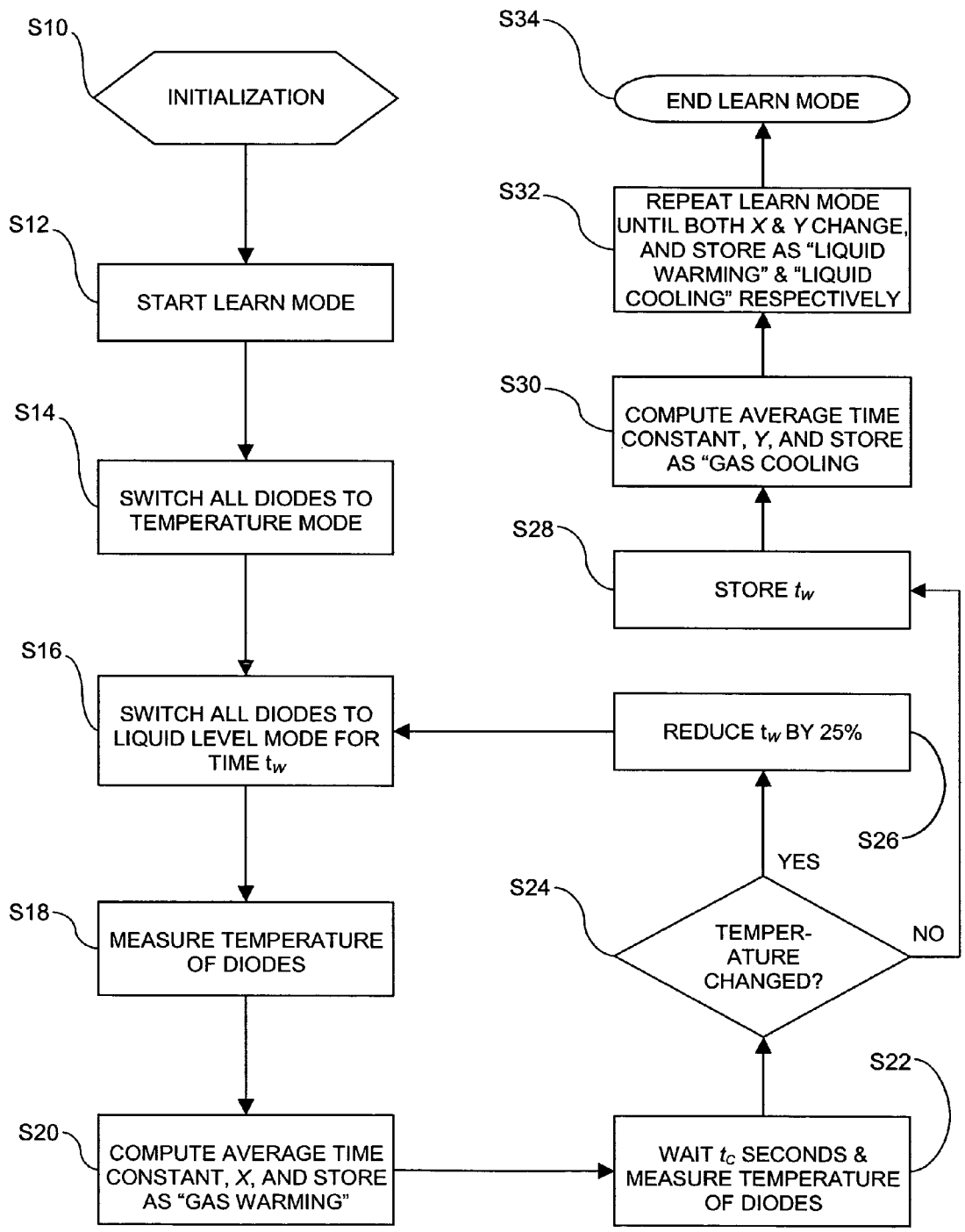
FIG. 2 is a flow chart illustrating a learning process for the system of FIG. 1 according to an example embodiment of the present invention.

With reference to FIG. 2, the following steps are performed by the microprocessor 12. At step S10, power is applied to the system after the probe 14 has been installed in the tank 16. At step S12, a "learn" command is sent to the system by an operator using the MGS software. The system measures the ullage pressure in the tank 16 and the system verifies that the tank 16 is at ambient pressure and the learning process begins. LN2 begins to fill the tank 16. During the filling and chill-down process, large amounts of cold GN2 are vented out of the tank 16, which will cool the entirety of the probe 14.

At step S14, all of the silicon diodes 18 on the probe 14 are switched to temperature mode and, as the tank 16 fills with LN2, the system monitors the temperature of all of the silicon diodes 18. In the present example, the system observes that the temperature of the silicon diodes 18 is dropping at a rate exceeding 10 K per minute as the tank continues to fill. Based on this high rate of temperature decrease, the system can determine that an initial fill operation of a normal boiling point fluid is occurring and that it is possible to continue the learning process. Eventually, the silicon diodes 18 reach cold steady-state temperatures. The operator is then notified via the MGS software that filing should be temporarily suspended. Filling of the tank 16 must be temporarily suspended by the operator prior to a level where any of the silicon diodes 18 are submerged. In the present example, the cold steady-state temperature would be approximately 79 K.

At step S16, the system switches all of the silicon diodes 18 to liquid level mode for an initial warming time interval, $t_W$, of three seconds. At step S18, the system then switches all of the silicon diodes 18 back to the temperature mode and immediately measures the temperature of each diode 18. Then, at step S20 the system averages all of the detected silicon diode temperatures together and calculates an average time constant, X, for the silicon diodes 18. The system compares the average time constant, X, to the time constant for each silicon diode 18 and discards any values outside of a predetermined range and recalculates X. Such outlying values are representative of silicon diodes 18 that are immersed in liquid (LN2) as the gas/liquid interface or liquid level 26 rises. The system saves the final X value as the "gas warming" time constant in the non-volatile memory 22. The stored value of X is representative of the heating thermal transient of the silicon diodes 18 while immersed in gas, and will be used during normal operation of the system 10. It should be appreciated that, although the gas/liquid interface 26 is represented schematically in FIG. 1 as a straight line, the gas/liquid interface 26 is actually amorphous and does not present as an instantaneous transition from gas to liquid.

At step S22, the system 10 waits for a cooling time interval, $t_C$, for example, ten seconds, from the prior temperature measurement and performs a second temperature measurement of each silicon diode 18. The system calculates the average temperature from the second temperature measurement. At step S24, the system compares the average from the second temperature measurements and compares it to the average temperature from the temperature measurement performed at step S20. If there is a difference, then the system concludes that the silicon diodes 18 have not yet reached thermal equilibrium, and the system proceeds to step S26 and repeats the procedure, using modified parameters, until the comparison indicates that the silicon diodes 18 have reached thermal equilibrium during the modified cooling time interval $t_C$. Specifically, at step S26, the three second warming time interval, $t_W$, used to make the first heating thermal transient measurement is reduced by a predetermined amount, for example 25%, and the process is repeated beginning at step S16. Steps S16 to S26 are repeated as many times as required to meet the criteria at step S24, such that each silicon diode 18 returns to the same initial thermal state after each heating/cooling cycle.

Once a sufficiently optimized time interval, $t_W$, is identified, it is saved in the non-volatile memory 22. The average gas heating time constant, X, is recalculated using the stored time interval, $t_W$, and then stored in the non-volatile memory 22 at step S28. At step S30, the system follows a similar process to determine the average time constant, Y, for the silicon diodes 18 based on the temperature measurement taken at step S22. Again, as in step S20, the system compares the average gas cooling time constant, Y, for the silicon diodes 18 to the time constant for each individual silicon diode 18. Any outliers are discarded and the average time constant, Y, is recalculated. The system saves the average time constant, Y, as the "gas cooling" time constant in the non-volatile memory 22. Upon completion of this step, the operator is notified via the MGS software that the system 10 is ready to continue the tank filing operation.

As the tank fills, at step S32, the system repeats steps S16 to S30 continuously until a change, presumably a reduction, is detected in both the warming time constant, X, and the cooling time constant, Y, on any of the silicon diodes 18. Such a change implies that the silicon diode 18 is now immersed in liquid or very near the gas/liquid interface 26. The operator is then notified via the MGS software that filing should again be temporarily suspended. The system continues to repeat the warming/cooling cycle at steps S16 to S30 until the warming time constant, X, and the cooling time constant, Y, both reach fixed values. These values, X and Y, are stored as the "liquid warming" time constant and the "liquid cooling" time constant, respectively, in the non-volatile memory 22. At step S34, the system sends a "learn complete" response back to the MGS software, notifying the operator that the system 10 is ready for use. Alternatively, the operator may choose to continue the learning process to determine individual time constants for each of the remaining silicon diodes 18 not yet submerged in liquid, i.e. below the liquid/vapor interface 26. This completes the description of the learning process according to the example embodiment.

Figure 3:
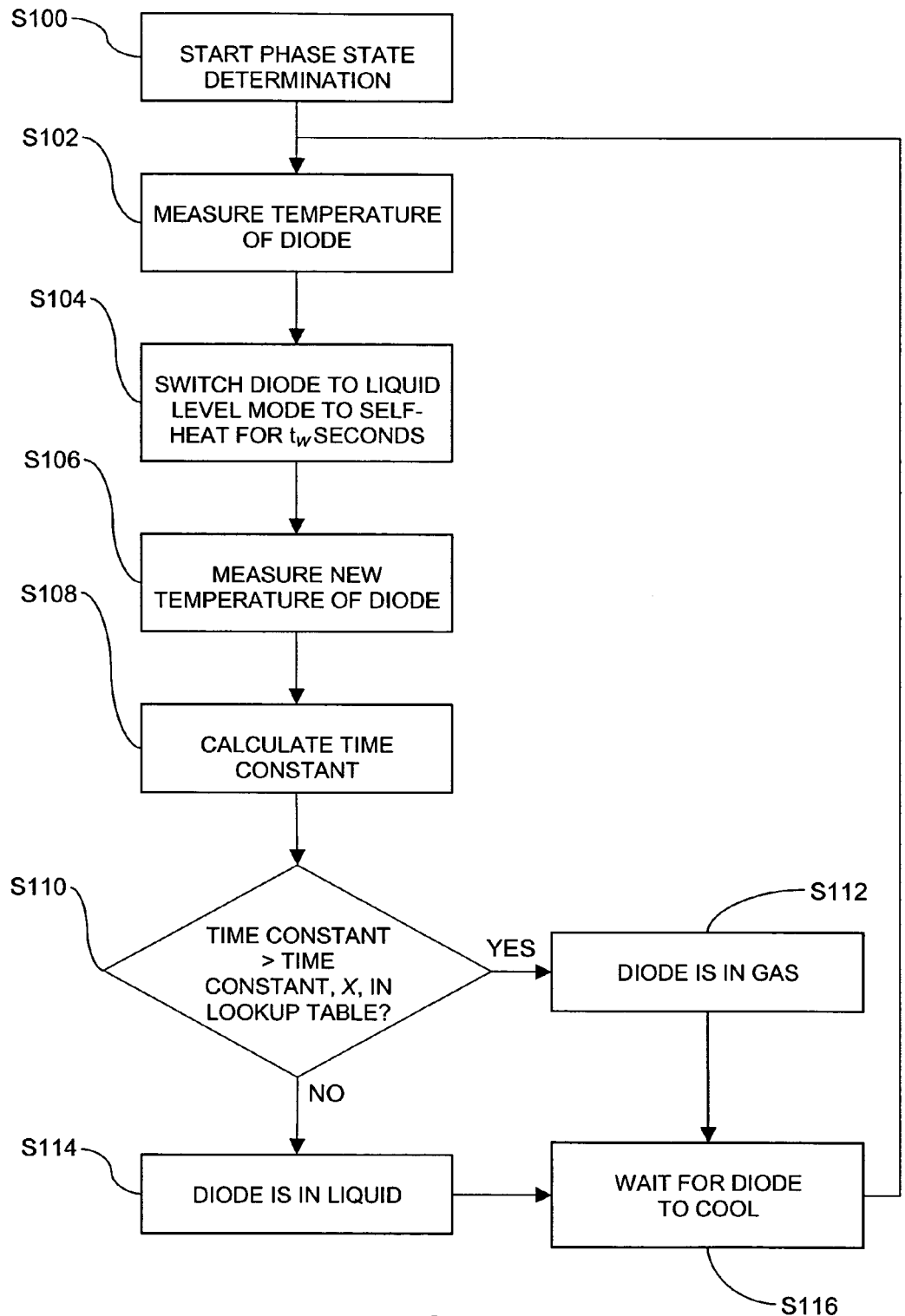
FIG. 3 is a flow chart illustrating a method of operating the system of FIG. 1 to determine the phase state of a fluid in which a silicon diode is immersed according to an example embodiment of the present invention.
Figure 4:
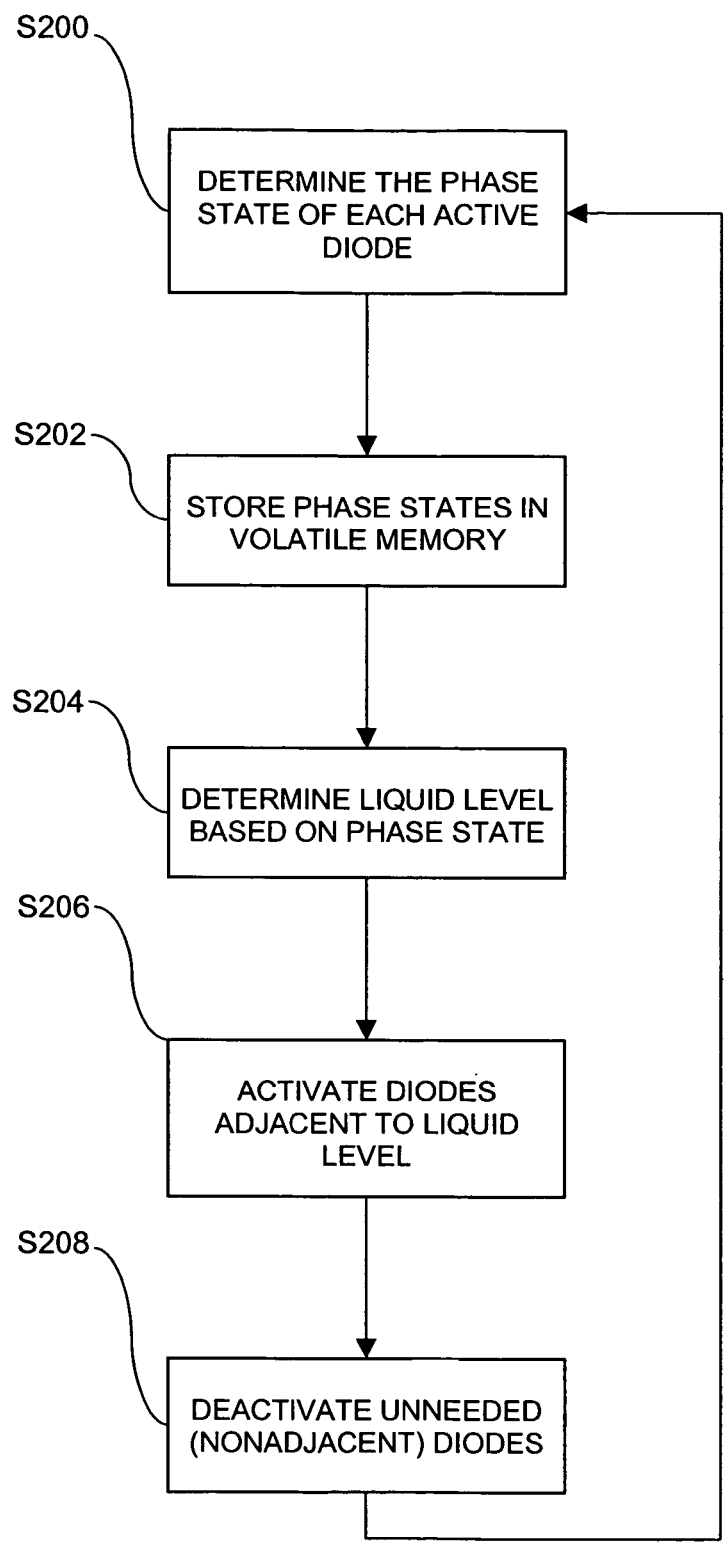
FIG. 4 is a flow chart illustrating a method of operating the system of FIG. 1 to determine the level of liquid in a tank according to an example embodiment of the present invention.

Once the learning process is complete, the example system can be placed in normal operating mode to determine the phase state of each silicon diode 18, to thereby determine the liquid level 26 in the tank 16. FIG. 3 illustrates the process of determining the phase state of a silicon diode 18 according to the present invention. FIG. 4 illustrates an alternative process of determining the liquid level 26 in a tank 16, including deactivating unneeded silicon diodes 18.

With reference to FIG. 3, the phase state determination process begins at step S100. At step S102, the temperature of a silicon diode 18 is measured. Then, at step S104, the silicon diode 18 is switched to liquid level mode, in which a higher current is applied to self-heat the silicon diode. Self-heating is performed for a predetermined period, tw, previously stored in the nonvolatile memory 22 during the learning process. At step S106, the silicon diode 18 is switched back to temperature mode and the temperature is immediately measured.

At step S108, the temperature measured in step S102 is then compared to the temperature measured in step S106 to determine a temperature difference. At step S110, if the temperature difference (e.g. the time constant) is greater than the liquid warming time constant determined in the learning process, then the silicon diode 18 is determined to be immersed in a gas. Control passes to step S112 and the gaseous phase state is reported to the MGS software. If the temperature difference is not greater than the threshold temperature, then the silicon diode 18 is determined to be immersed in a liquid. Control then passes to step S114 and the liquid phase state is reported to the MGS software.

If the time constant does not correspond to the established time constants for liquid versus gas, then an error is reported to the MGS software. Alternatively, when an error is detected, a more sophisticated relativistic method can be performed to determine the fluid phase. For example, individual time constants can be determined for all of the silicon diodes 18 on the probe 14 as described above. These values can be compared to the established time constant in an attempt to determine the position of gas/liquid interface 26. For example, silicon diodes 18 determined to have relatively high time constants, such as within 5% of the previously stored gas warming time constant, can be presumed to be immersed in a gas. Similarly, silicon diodes 18 determined to have relatively time constants, such as within 5% of the previously stored liquid warming time constant, can be presumed to be immersed in a liquid. The operator may vary these percentages to balance system response time versus the level of confidence in the phase state.

A similar process is followed using the cooling portion of the cycle. The time constants measured are compared to the liquid cooling time constant and the gas cooling time constant stored in the non-volatile memory 22 during the learning process.

After the silicon diode has cooled, at step S116, the phase state determination process can be repeated indefinitely at step S102. The phase state determination process is performed for each active silicon diode 18. It should be appreciated that each silicon diode 18 can undergo the phase determining process in sequence, or the entire array of silicon diodes 18 can undergo the phase determination process simultaneously to increase overall system performance.

With reference to FIG. 4, an alternative process is illustrated, which is performed by the microprocessor to determine the liquid level 26 in the tank 16 using a reduced level of electrical and computational power. First, at step S200, the phase state of each active diode is determined by performing the phase state determination process described above with reference to FIG. 3. As used herein, the term "active diode" refers to a diode which is allowed to be placed in liquid level determination mode. The term "inactive diode" refers to a diode which is prevented from being placed in liquid level determination mode.

Next, at step S202, the system 10 stores the current liquid/gas state of each diode 18 in the volatile memory 24. The system may also store the ullage pressure in the tank, measured by a pressure sensor (not shown) in the volatile memory 24. Then, at step S204, based on the phase state of each silicon diode 18, the liquid level 26 is determined. The liquid level 26 is determined to be located at a level above a silicon diode 18 that is determined to be immersed in liquid and below an adjacent silicon diode 18 that is determined to be immersed in gas. The liquid level 26 is reported to the MGS software, which proceeds to calculate the mass of fluid in the tank.

At step S206, if the liquid level 26 has changed, adjacent inactive silicon diodes must be activated. If the liquid level 26 has increased, for example, then the next higher silicon diode 18 is made active. If the liquid level 26 has decreased, then the next lower silicon diode 18 is made active. Likewise, at step S208, after a change in the liquid level 26, silicon diodes 18 that are no longer adjacent to the liquid level 26, are deactivated (i.e. placed in temperature measurement mode only).

Alternatively, the system 10 can be programmed to periodically perform a "conformity test" on the results of step S206 and S208 and send an error code if the results do not meet certain criteria. The system 10 can also be programmed to periodically confirm that the ullage pressure has not changed significantly. Such a change might indicate that the learned time constants are no longer valid, and that it is necessary to perform the learn process again. An error message is then sent to the MGS software to indicate the need for a learning process. Alternatively, instead of a single table of time constants learned for a given pressure, the system can be modified to generate a series of tables during the learning process, each table corresponding to a range of ullage pressures. Thus, the system 10 can be programmed to automatically adapt to a change in ullage pressure by switching tables. not meet certain criteria. The system 10 can also be programmed to periodically confirm that the ullage pressure has not changed significantly. Such a change might indicate that the learned time constants are no longer valid, and that it is necessary to perform the learn process again. An error message is then sent to the MGS software to indicate the need for a learning process. Alternatively, instead of a single table of time constants learned for a given pressure, the system can be modified to generate a series of tables during the learning process, each table corresponding to a range of ullage pressures. Thus, the system 10 can be programmed to automatically adapt to a change in ullage pressure by switching tables.

The system 10 responds to queries and commands from the MGS software requesting information (e.g. temperature, ullage pressure, liquid level, etc.) and acts on them as requested. The process repeats continuously beginning at step S200.

The above-described methods according to the example embodiment is only an example of an implementation of the present invention. One of ordinary skill in the art will appreciate there are many more sophisticated approaches that can be used for more complicated applications, such as densified propellant tanks, tanks with rapid fill or discharge rates, superfluid tanks and so on. For example, instead of using "static" time constant tables, it would be possible to use pressure-dependant tables as described above. Another example would be to provide time and temperature dependant tables, such as might be required for pressurized densified propellant tanks.

Further, the use of lookup tables can be replaced by a parametric equation designed to model the established time constants in comparison with one or more additional parameters. For example, a system according to the present invention may use a higher-order parametric equation relating time constants to the type of fluid, local fluid temperature, ullage pressure, tank skin temperature and any other appropriate independent variable. Such a system would be able to adapt to any tank and any fluid at any state automatically, without user intervention.

Due to the flexibility of the concepts used for determining fluid phase according to the present invention, numerous control and/or measurement scenarios are possible, which can be selected to meet the needs of a particular application. It should be evident that this disclosure is provided by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A system for determining the position of a gas/liquid interface of a fluid in a tank, the system comprising:
    a probe comprising a plurality of silicon diodes arranged on a substrate; and
    a controller for controlling power applied to each of the plurality of silicon diodes to make a determination of whether a fluid in which at least one of the plurality of silicon diodes is immersed is a liquid or a gas based on a rate of transfer of heat from the at least one of the plurality of silicon diodes to the fluid, wherein the determination is made by measuring a characteristic of a thermal transient of the at least one of the plurality of silicon diodes.

2. The system of claim 1, wherein the characteristic is a temperature.

3. The system of claim 1, wherein the characteristic is a time constant.

4. The system of claim 1, further comprising a storage device for storing a lookup table, wherein the determination is made by comparing the characteristic to values in the lookup table.

5. The system of claim 1, wherein the determination is made by calculating the result of a parametric equation based as a function of the characteristic.

6. The system of claim 1, wherein each of the plurality of silicon diodes is self-heating upon an increase in power by the controller.

7. The system of claim 1, wherein the probe has a temperature mode and a gas/liquid interface position detecting mode.

8. The system of claim 1, wherein the plurality of silicon diodes are arrange linearly on the substrate.

9. The system of claim 1, wherein the controller increases the power to induce the thermal transient in the at least one of the plurality of silicon diodes.

10. A system for determining the position of a gas/liquid interface of a fluid in a tank, the system comprising:
    a probe comprising a plurality of silicon diodes arranged on a substrate; and
    a controller for controlling power applied to each of the plurality of silicon diodes to make a determination of whether a fluid in which at least one of the plurality of silicon diodes is immersed is a liquid or a gas based on a rate of transfer of heat from the at least one of the plurality of silicon diodes to the fluid, wherein the controller applies power to less than all of the plurality of silicon diodes based on the position of the gas/liquid interface in the tank.

11. The system of claim 10, wherein the controller applies power only to two adjacent ones of the plurality of silicon diodes for detecting a gas/liquid interface positioned between the two adjacent ones of the plurality of silicon diodes.

12. Method for determining the phase of a fluid in which a sensor is immersed, the method comprising the steps of:
    immersing a sensor in a fluid;
    inducing a thermal transient in the sensor by increasing power applied to the sensor;
    measuring a value of the thermal transient of the sensor; and
    determining a phase of the fluid based on the measured value of the thermal transient.

13. The method of claim 12, further comprising a step of heating the sensor after increasing the power, wherein the step of measuring is performed during the heating of the sensor.

14. The method of claim 12, further comprising a step of cooling the sensor after increasing the power, wherein the step of measuring is performed during the cooling of the sensor.

15. The method of claim 12, wherein the step of determining comprises comparing the measured value to a table of stored values.

16. Method for determining the phase of a fluid in which a sensor is immersed, the method comprising the steps of:
    performing a learning process, wherein values are determined in the learning process are stored in a table;
    immersing a sensor in a fluid;
    increasing power applied to the sensor;
    measuring a value of a thermal transient of the sensor; and
    determining a phase of the fluid based on the measured value of the thermal transient, including comparing the measured value to the values stored in the table during the learning process.

17. The method of claim 12, wherein the step of determining comprises calculating the result of a parametric equation as a function of the measured value.

18. Method for determining the phase of a fluid in which a sensor is immersed, the method comprising the steps of:
    immersing a sensor in a fluid;
    increasing power applied to the sensor;
    measuring a value of a thermal transient of the sensor;
    determining a phase of the fluid based on the measured value of the thermal transient; and
    performing a learning process, wherein the sensor comprises at least one silicon diode and wherein the learning process comprises the steps of:
    immersing the silicon diode in a gas;
    after the step of immersing, increasing power applied to the silicon diode for a warming period, $t_W$;
    reducing the power to the silicon diode after the warming period, $t_W$, has elapsed;
    measuring the temperature of the silicon diode after reducing the power;
    computing a time constant based on the measured temperature; and storing the time constant in a storage device as a gas warming time constant.

19. The method of claim 18, wherein the learning process further comprises the steps of:
waiting for a cooling period, $t_C$, after storing the time constant;
measuring the temperature of the silicon diode after waiting for the predetermined period;
computing a second time constant based on the second measured temperature; and storing the second time constant in the storage device as a gas cooling time constant.

20. The method of claim 18, wherein the learning process further comprises the steps of:
immersing the silicon diode in a liquid;
after the second step of immersing, increasing power applied to the silicon diode for a second warming period, $t_W$;
reducing the power to the silicon diode after the second period of time, T, has elapsed;
measuring the temperature of the silicon diode after reducing the power;
computing a second time constant based on the second measured temperature; and
storing the second time constant in the storage device as a liquid warming time constant.

21. The method of claim 20, wherein the learning process further comprises the step of comparing the first measured temperature and the second measured temperature and reducing the value of $t_W$ and repeating the learning process if the first measured temperature and the second measured temperature are different.

22. The method of claim 20, wherein the learning process further comprises the steps of:
waiting for a cooling period, $t_C$, after storing the time constant;
measuring the temperature of the silicon diode after waiting for the predetermined period;
computing a second time constant based on the second measured temperature; and storing the second time constant in the storage device as a liquid cooling time constant.

23. The method of claim 22, wherein the learning process further comprises the step of comparing the first measured temperature and the second measured temperature and reducing the value of $t_C$ and repeating the learning process if the first measured temperature and the second measured temperature are different.

24. A method of determining a position of a gas/liquid interface of a fluid in a tank, the method comprising the steps of:
installing a probe in the tank, the probe comprising a plurality of silicon diodes arranged linearly on a substrate;
immersing the probe in fluid;
inducing a thermal transient in the sensor by increasing power applied to at least two of the plurality of silicon diodes;
measuring a value of the thermal transient of each of the silicon diodes;
determining a phase of the fluid at each of the at least two silicon diodes based on the measured value of the thermal transient; and
determining a location of a gas/liquid interface based on the phase determined for each of the at least two diodes.

* * * * *

UNITED STATES PATENT AND TRADEMARK OFFICE
CERTIFICATE OF CORRECTION

PATENT NO.       : 7,392,691 B1  
APPLICATION NO.  : 11/255416  
DATED            : July 1, 2008  
INVENTOR(S)      : Alexander J. Yeckley Page 1 of 1

It is certified that error appears in the above-identified patent and that said Letters Patent is hereby corrected as shown below:

Column 1, line 5, the contract number "F296-1-02-C-0210" should read --F29601-02-C-0210--.

Signed and Sealed this

Twenty-third Day of September, 2008

JON W. DUDAS  
*Director of the United States Patent and Trademark Office*